April 13, 1943.  P. J. HEALY  2,316,690
SWIVELLY MOUNTED COUPLING NUT
Filed Jan. 11, 1943
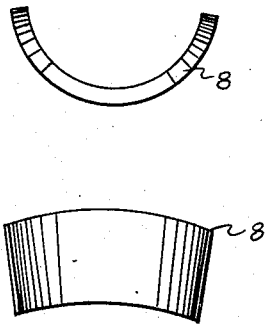
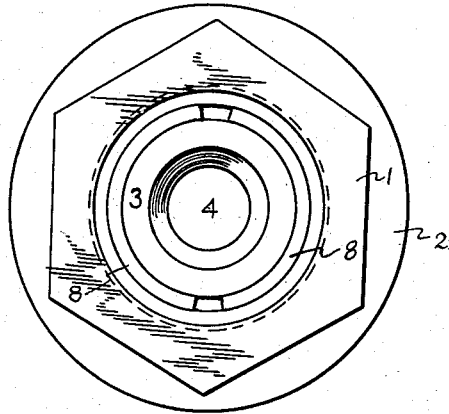
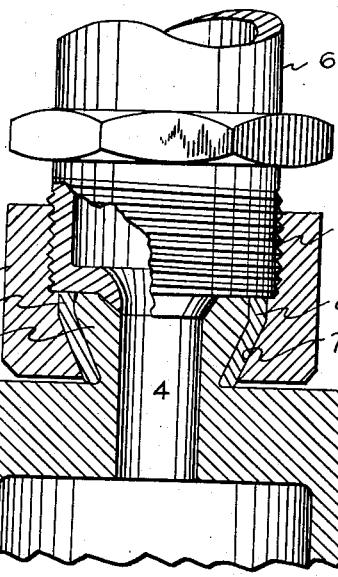
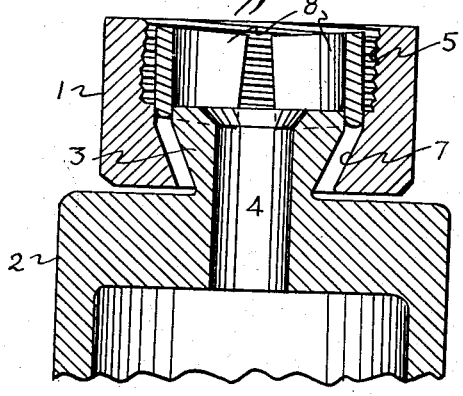
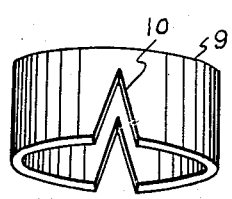
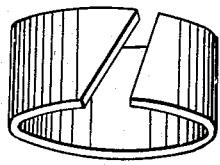
Inventor
Patrick J. Healy
By J. J. Murray
Attorney Patented Apr. 13, 1943

2,316,690

UNITED STATES PATENT OFFICE 2,316,690

SWIVELLY MOUNTED COUPLING NUT

Patrick J. Healy, Detroit, Mich.

Application January 11, 1943, Serial No. 471,923

5 Claims. (Cl. 285—97.7)

This invention relates to swivelly mounted nuts whereby a pipe, bolt, or other threaded part may be readily rotatively coupled to a body mounting such a nut. Said invention may be considered as an improvement on the subject matter of my copending application Serial Number 430,751, filed Feb. 13, 1942.

An object of the invention is to adapt a nut to be permanently swiveled on a support by means of a single punch press operation, without imposing any such pressure on the nut as might mutilate or distort its screw threads.

Another object is to swivelly mount a nut on a support by seating the nut on the support in a surrounding relation to an undercut nipple projecting from the support, and forcing an insert between the nut and nipple, the nut having an interior face serving to deflect the insert into engagement with the undercut portion of the nipple, thus preventing escape of the nut.

These and various other objects are attained by the construction hereinafter described and illustrated in the accompanying drawing, wherein:

Fig. 1 is an axial sectional view of a support, a nut to be swivelly attached to such support, and an insert for retaining the nut in place, an initial position of the insert being shown.

Fig. 2 is a similar view showing the insert in its effective position.

Fig. 3 is a top plan view of the construction.

Fig. 4 is a top plan view of a segment of said insert, prior to its insertion.

Fig. 5 is a side view of said insert.

Fig. 6 illustrates in perspective a modified type of insert.

Fig. 7 perspectively shows another type of insert.

In these views, the reference character 1 designates a nut designed to be swivelly secured upon a support 2, the latter being integrally formed with a projecting nipple 3 which is exteriorly undercut in the form of an inverted conical frustum, and which serves for swivelly mounting said nut. The support shown is hollow and has a passage 4 extending from its interior through the nipple 3, but the particular nature of said support is immaterial. The threaded central opening 5 of the nut is for the purpose of attaching a pipe 6 or other element to the body 1, as best appears in Fig. 2. The nut 1 seats on the support 2 in a spaced surrounding relation to the nipple 3, and a portion 7 of the interior face of the nut confronting the undercut face of the nipple is of an inverted frusto-conical shape such as preferably to establish substantial parallelism with said undercut face. The arrangement is such that the minimum interior diameter of the nut exceeds slightly the maximum exterior diameter of the nipple so that the nipple may be entered in the nut.

To prevent escape of the nut from its surrounding relation to the nipple there is driven between the nut and nipple a segmental insert 8 initially having a substantially cylindrical form but bent in the course of its insertion to conform to the nipple. The face 7 of the nut acts as a deflector or bending die for the insert, changing its original cylindrical shape to that of an inverted frustum. The illustrated insert comprises two segments which are each originally of a substantially semi-cylindrical form, as best appears in Figs. 4 and 5. While two such segments are preferred, a greater number is feasible and it is further feasible to employ a one-piece insert 9 as per Fig. 6 or 7. Such an insert, however, will preferably have one or more V-shaped slots 10 extended upwardly therein to facilitate conforming the insert to the nipple, or will be slitted as per Fig. 7.

It will be noted that the upper end portion of the nipple 3 has a cylindrical outer face and that the nut 1 when seated on the support 2 opposes a cylindrical face to that of the nipple. This permits the insert 8 to be readily entered between upper end of the nipple and nut and to be thus held in place preliminary to applying pressure to effect a complete insertion. The required pressure may be applied by a suitable press or in any other desired manner.

As compared to my prior construction hereinbefore mentioned, a considerable saving of time is accomplished, since obviously the insert 8 or 9 may be forced into place much more rapidly than it is feasible to screw the nut to its swiveled position as required in said prior construction. The most vital advantage, however, gained over prior practice lies in avoidance of any heavy pressure upon the nut in effecting its assembly with a support. Avoidance of deformation of the threads 5 of the nut is of course vital, and such deformation is a possibility when the threaded nut is subjected to a press operation, since through carelessness or lack of skill on the part of a press operator, the applied pressure may be excessive. Furthermore, the construction as now improved, is simpler and less costly than heretofore, the insert being the product of a simple stamping operation.

It is to be observed that segments forming the insert while stamped to cylindrical form are of a shape particularly adapting them to be bent to the form of perfect conical segments in course of their insertion. When inserted, said segments will very tightly fit the surface 7 of the nut but will have such slight clearance (not shown) from the nipple 3 as to afford the nut a free rotation about the nipple. Thus when a pipe 6 or some other threaded part is being screwed into the nut, rotation of the pipe or other part is not necessary. This is desirable since for many purposes, it is either not feasible or unduly difficult to rotate the part which the nut is threaded to engage.

It is to be noted that the pipe 6 when screwed into place opposes its inner end to the outer end of the insert 8 or 9 and thus affords further assurance against escape of the insert from its effective position.

What I claim is:

1. In a swivelly mounted nut, the combination with a body having a projecting nipple reduced in external diameter at its inner end, of a nut having a portion surrounding and spaced from said nipple, said portion having an interior face converged toward the axis of the nipple as extended into said body, said nut being freely rotative on the nipple, and a member inserted between said interior face and the nipple and bent toward the nipple axis by said interior face, whereby said member substantially conforms to the reduced portion of the nipple and retains the nut swivelly on the nipple, said member being proportioned to lie, substantially in its entirety between the nipple and said interior face, when inserted.

2. A swivelly mounted nut as set forth in claim 1, said inserted member comprising parts engaging at opposite sides of the nipple.

3. A swivelly mounted nut, as set forth in claim 1, said inserted member being a bushing extending substantially around the nipple.

4. A swivelly mounted nut, as set forth in claim 1, said inserted member being a bushing comprising a plurality of separate segments.

5. In a swivelly mounted nut, as set forth in claim 1, a member having a portion threaded into the nut and blocking escape of the inserted member from its specified position.

PATRICK J. HEALY.